March 3, 1970            F. A. JEFFRIES            3,497,990

CELLULAR ANTIFOULING COVERING FOR SUBMERGED MARINE OBJECTS

Filed Nov. 15, 1967            2 Sheets-Sheet 1

INVENTOR.
FRANK A. JEFFRIES

BY    *Milliken*

ATTORNEY

INVENTOR.
FRANK A. JEFFRIES
BY
ATTORNEY

United States Patent Office 3,497,990
Patented Mar. 3, 1970

3,497,990
CELLULAR ANTIFOULING COVERING FOR
SUBMERGED MARINE OBJECTS
Frank A. Jeffries, Cuyahoga Falls, Ohio, assignor to The
Goodyear Tire & Rubber Company, Akron, Ohio, a
corporation of Ohio
Filed Nov. 15, 1967, Ser. No. 683,230
Int. Cl. C23f 15/00; A01n 23/00, 17/00
U.S. Cl. 43—131                              8 Claims

ABSTRACT OF THE DISCLOSURE

An antifouling protective covering for preventing growth of barnacles and other marine organisms on the exterior of marine objects such as sonar domes and the like submerged in sea water. The covering consists of a layer of foam material having interconnected cells which are filled with diffusible antifoulant material and an outer cover layer of elastomeric material which is permeable to the antifoulant. The antifoulant material diffuses through the outer cover layer and provides a continuous supply of antifoulant material to the exposed outer surface to replace any antifoulant washed away by the sea water. The covering includes a conduit system running throughout the cellular layer to assist in distribution of antifoulant solution in the cellular layer when same is injected therein.

This invention relates to a protective covering for preventing the growth of barnacles and other marine organisms on submerged marine objects.

BACKGROUND OF THE INVENTION

In the past, numerous coatings have been devised for undersea installations in an attempt to prevent the growth of marine organisms such as barnacles, algae, and various other organisms on the surface of such underwater installations. Such coatings have usually been in the form of paint applied to the surface of the object to be protected and contained such toxic agents as various oxides or salts of copper, mercury, zinc, lead, and arsenic. Typical examples of antifouling paints are described in British Patent No. 1,062,324. The antifouling paints used today have a number of defects. One of the primary defects is the short foul-free life. Secondly, such paints lack durability and have low abrasion resistance. Many paints have unfavorable chemical compatability with the surfaces on which they are used and tend to magnify electrolytic corrosion when used over metallic surfaces. Paints which have such characteristics require an additional anticorrosive undercoating.

The short antifouling life of such paints is due to the small amount of toxic present in the paint. It is a problem to provide a sufficient amount of toxic in the coating to last for any great length of time. This is particularly true since it is very time consuming and expensive to build up an antifouling paint layer much beyond 10 mils in thickness; therefore, the total amount of paint available to serve as a reservoir or matrix for containing toxic material is very small, and results in the toxic material being washed away from the surface in a relatively short time. The solution to the problem would, of course, be to devise a matrix or reservoir which would provide a continuous supply of toxic material to replace that which washes away from the outer surface.

OBJECTS OF THE INVENTION

It is the primary object of this invention to overcome the difficulties encountered by prior art antifouling coverings by providing a reservoir or matrix which will contain a much larger amount of toxic or antifouling material than can be contained in an ordinary layer of antifouling paint and can be periodically or continuously replenished with antifouling material.

It is a further object of this invention to provide an antifouling covering which is usable on a great variety of submerged marine structures.

Still another object of the invention is to provide an antifouling covering which is particularly adaptable for use with flexible fabric structures as well as rigid structures used in underwater installations.

These and other objects of the invention will become more apparaent in the following specification and the accompanying drawings.

DESCRIPTION OF THE PREFERRED EMBODIMENTS

Figure 1:
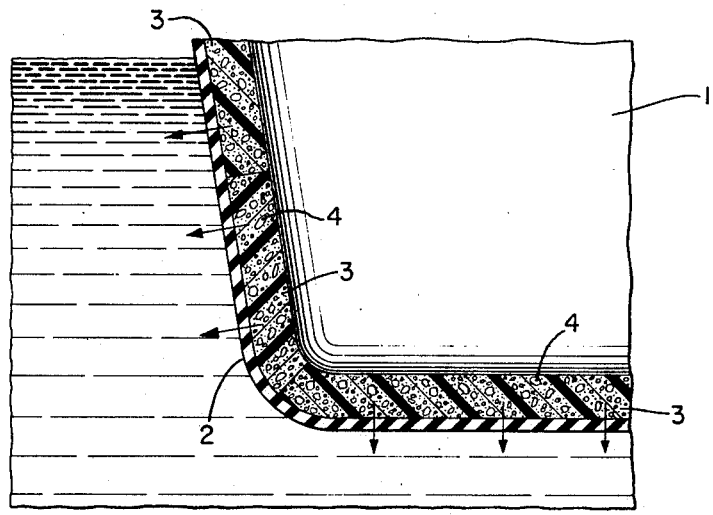
FIG. 1 is a fragmentary side view of the submerged hull of a ship with a portion broken away to show the protective antifouling covering of the invention.

FIG. 1 shows a submerged hull of a ship indicated by the numeral 1 as a typical example of a submerged object on which the covering of the present invention may be used. The exterior of the hull 1 is covered by an antifouling covering assembly indicated generally by the numeral 2.

It should be understood that the ships hull 1 is merely illustrative of one type of structure on which the covering of this invention may be used. It may also be used on underwater fuel tanks, sonar domes, and many other types of structures which may be either rigid or flexible. The covering 2 is comprised of a plurality of flat cellular strips 3 of foam-like material adhered to the surface of the hull 1 in edge-to-edge relationship to form an antifoulant storage layer 4 covering the entire surface where antifouling protection is desired. The cellular strips 3 are made of expanded foam having interconnected cells. Polyvinyl chloride, polyurethane, polyethylene, or any other suitable foam may be used which contains the desired cell structure.

Covering the antifoulant storage layer 4 is an outer elastomeric cover layer 5 of neoprene. The layer 5 may also be made of natural rubber, Hypalon, or any other material which is permeable to the antifoulant materials to be used.

The antifoulant storage layer 4 is filled with a liquid or semi-liquid solution of antifoulant material such as bis (tri-n butyl tin oxide) which penetrates the cells of the layer 4 and gradually diffuses outwardly through the cover layer 5 to replace antifoulant solution which is washed away from the outer surface of the cover layer 5.

Figure 2:
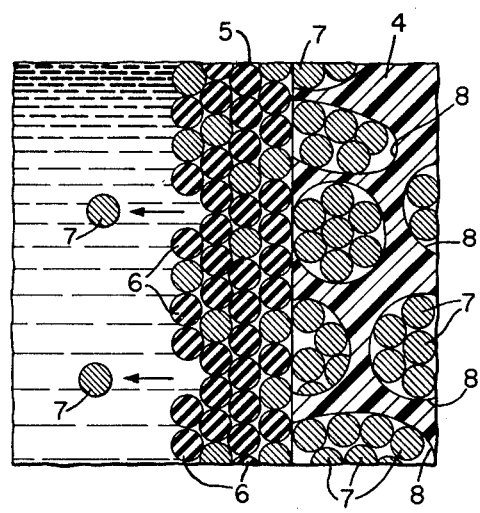
FIG. 2 is a greatly enlarged view of the outer wall of the covering shown in FIG. 1 illustrating the manner in which the toxic material diffuses through the outer wall.

As may be seen from FIG. 2, the cover layer 5 is made up of a plurality of individual rubber molecules 6 which serve as a matrix for a plurality of molecules 7 of the antifoulant material. Since FIG. 2 is greatly enlarged, it shows a plurality of cells 8 within the storage layer 4 containing molecules 7 of the antifoulant material. Since the layer 4 is an open-celled material, the molecules 7 can pass outwardly through the layer 4 and through the cover layer 5 to the surface thereof to replace antifoulant molecules 7 which are washed away by the action of the sea water. The length of time which the protective covering 2 will continue to serve its purpose depends upon the amount of antifoulant material stored in the layer 4 and the rate at which he molecules 7 diffuse through the cover layer 5 to the outer surface thereof. The rate of diffusion can be controlled by the cellular structure of the layer 4 and by the molecular structure of the rubber cover layer 5.

As a typical example for the purpose of illustrating this invention, the antifoulant material used is bis(tri-n butyl tin oxide) and the cover layer 5 is neoprene. Other toxic agents may also be used such as bis(n-tributyl tin sulfide), phenyl mercury oleate, copper pentachlorophenate, tri-butyl tin acetate, tri-butyl tin fluoride and triphenyl tin chloride. In addition to any of the antifoulant materials described previously, the storage layer 4 may also be filled with algaecides and corrosion inhibitors. The type of elastomeric material used for the cover layer 5 must be determined by the type of antifoulant used. Some antifoulant materials, because of their molecular structure, will work more satisfactorily with certain types of elastomers than with others.

The diffusion rate of the antifoulant material through the layer 5 can be affected by compounding techniques with the use of additives which increase or decrease the diffusion rate. The condition under which the layer 5 is cured will control the cross linking of the molecules and also will affect the diffusion rate.

Figure 3:
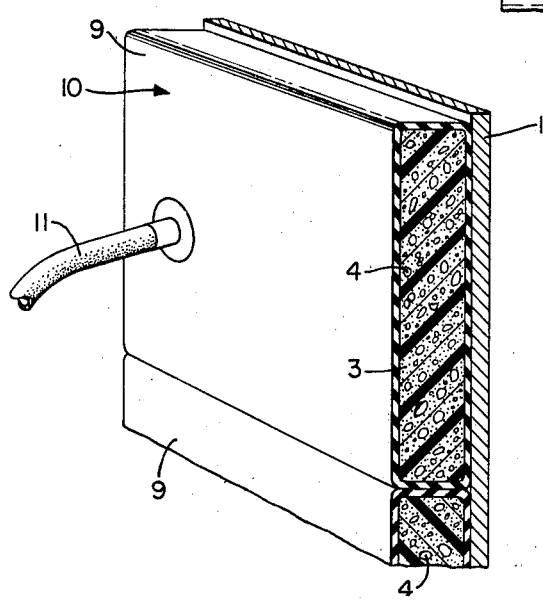
FIG. 3 is a fragmentary perspective view showing another embodiment of the invention.

Another embodiment of the invention is shown in FIG. 3 which differs from FIG. 1 in that the storage layer 4 does not directly contact the outer surface of the hull 1 but is encased in a flat tubular cover 9 made of the same material as the cover layer 5 in FIG. 1. The tubular cover 9 must also be permeable to the antifoulant stored in the storage layer 4. In order to prepare a covering strip 10, a tubular cover 9 is filled with expanded foam which forms the antifoulant storage layer 4. Suitable inlet openings 11 are provided where required at locations along the outer surface of the tubular cover 9 to permit antifoulant material to be injected into the cellular storage layer 4. In some instances it may be desirable to inject the antifoulant material into the cellular layer under pressure which is greater than atmospheric pressure. This is necessary to compensate for hydraulic pressure exerted against the outside cover when the object to be protected is submerged at any great depth. This increased internal pressure will prevent the external pressure of the sea water from collapsing the storage layer 4.

After a plurality of the strips 10 are prepared and filled with antifoulant material, they are then adhered to the outside surface of the hull 1 in edge-to-edge relationship.

Figure 4:
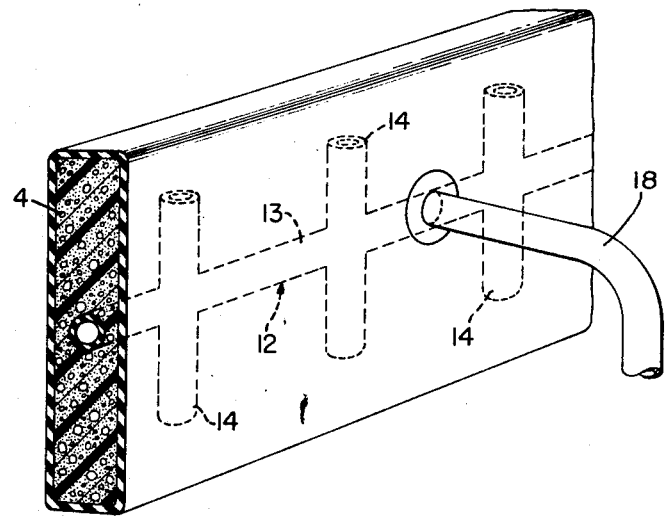
FIG. 4 is a fragmentary perspective view of a strip of covering material of the invention showing an internal conduit system.

FIG. 4 shows a covering strip 10 similar to that shown in FIG. 3 but with the addition of an internal conduit system 12 having a main conduit 13 and a plurality of branch conduits 14 located centrally within the cellular storage layer 4. These main conduits 13 may be connected to a central manifold 18 through which additional antifouling solution may be added either periodically or continuously.

Figure 5:
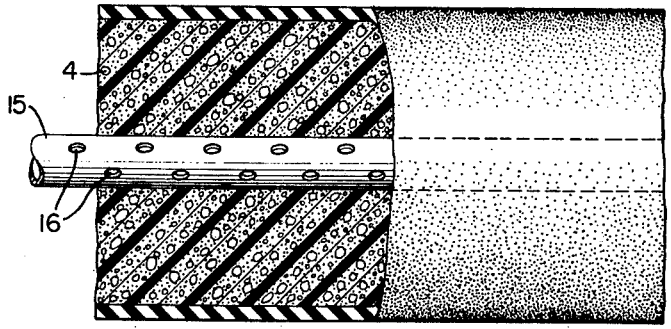
FIG. 5 is a fragmentary view of one embodiment of the protective covering of the invention with a portion broken away to show a modified internal conduit system.

FIG. 5 shows a variation of FIG. 4 wherein a centrally located conduit 15 has a plurality of holes 16 in the wall thereof which serve the same function as the branch conduits 14 in facilitating the spread of the antifoulant material to all parts of the cellular layer 4.

Figure 6:
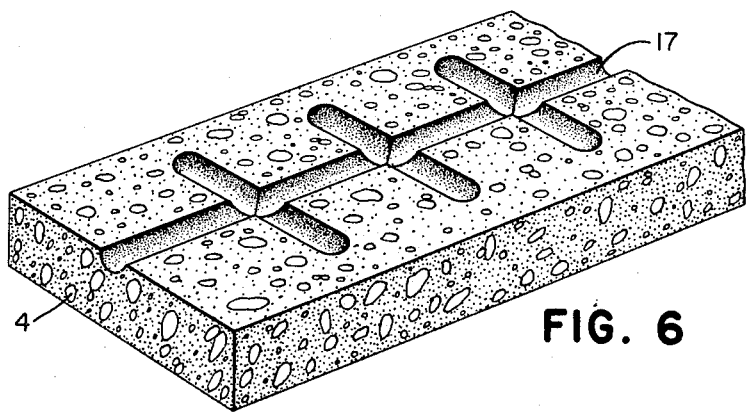
FIG. 6 is a fragmentary perspective view of a strip of cellular material used in this invention with a conduit system molded on one surface thereof.

FIG. 6 shows a different way of forming a conduit system in the cellular layer 4 in which a plurality of grooves 17 are molded in the surface of the cellular layer 4. The layer 4 shown in FIG. 6 may either be adhered directly to the hull of a ship with the grooves 17 lying next to the hull and forming a conduit system therewith, or the layer 4 of FIG. 6 may also be enclosed in a tubular cover 9 as shown in FIG. 3. Regardless of which way the storage layer 4 is used, the grooves 17 will serve as a conduit system much in the same manner as the internal conduit system 12 in FIG. 4.

Since this invention is directed primarily toward the reservoir or container for supplying the antifoulant material rather than the antifoulant material per se, the chemical aspects of all the antifoulant materials which may be used will not be described in further detail. It will be understood that although certain types of foam material have been shown and certain materials have been named for use as outer covers, it should be noted that any cellular material may be used so long as the cells are interconnecting and any outer cover may be used which is permeable with respect to the antifoulant material.

Various changes can be made in the illustrative embodiments shown herein without departing from the scope of the invention.

What is claimed is:

1. An antifouling protective covering for preventing the growth of marine oragnisms on the exterior of objects submerged in sea water comprising:
    (A) a layer of cellular material having interconnecting cells attached to the outer wall of an object to be protected;
    (B) a diffusible antifouling solution filling the cells of said layer;
    (C) an outer cover layer of material which is permeable with respect to the antifouling solution to permit diffusion of said solution therethrough to provide a continuous supply of the antifouling solution to the outer surface of the cover layer to replace that which is washed away by the sea water;
    (D) an internal conduit system running throughout the cellular layer to assist in the distribution of antifoulant solution to all parts of said layer when the antifoulant solution is injected therein;
    (E) and inlet conduit means selectively communicating said internal conduit system with the surrounding exterior to said outer cover layer, wherein additional antifoulant solution can be injected into said cellular layer with said covering in place on said submerged object.

2. An antifouling covering as claimed in claim 1 wherein the conduit system is comprised of a plurality of channels cast in the cellular layer.

3. An antifouling covering as claimed in claim 1 wherein the antifoulant solution is under pressure within the cellular layer to prevent collapse of said layer due to outside hydraulic pressure of the water.

4. An antifouling covering as claimed in claim 1 wherein the cellular layer is expanded polyvinyl chloride.

5. An antifouling covering as claimed in claim 1 wherein the cellular layer is expanded polyurethane.

6. An antifouling covering as claimed in claim 1 wherein the outer cover layer is made of a rubber material.

7. An antifouling covering as claimed in claim 1 wherein the internal conduits are attached to a central manifold through which antifoulant solution is added periodically or continuously.

8. An antifouling covering as calimed in claim 1 wherein the conduit system has at least one duct with a plurality of holes along the length thereof to permit the antifouling solution to pass from the duct into the cellular material.

References Cited

UNITED STATES PATENTS

| | | | |
|---|---|---|---|
| 879,640 | 2/1908 | Kennon | 52—517 |
| 1,973,813 | 9/1934 | Kelley. | |
| 2,191,248 | 2/1940 | Cappel | 61—54 |
| 2,435,986 | 2/1948 | Taylor | 114—222 XR |
| 2,865,702 | 12/1958 | Bruner | 106—15 XR |
| 2,874,548 | 2/1959 | Drushel et al. | 61—54 |
| 2,930,710 | 3/1960 | Koenecke et al. | 117—75 XR |
| 3,033,724 | 5/1962 | Stokes | 161—49 XR |
| 3,276,841 | 10/1966 | Philip et al. | 21—61 XR |
| 3,426,473 | 2/1969 | Cardarelli et al. | 43—131 |

MORRIS O. WOLK, Primary Examiner

BARRY S. RICHMAN, Assistant Examiner

U.S. Cl. X.R.

21—2.7, 58, 61; 52—309, 517; 61—54; 114—222; 161—161; 239—57